United States Patent [19]

Yamamoto

[11] Patent Number: 5,504,520
[45] Date of Patent: Apr. 2, 1996

[54] AUTOMATIC TELEVISION-CAMERA SUPERVISORY SYSTEM

[75] Inventor: Takahiro Yamamoto, Fukuoka, Japan

[73] Assignee: Anima Electronics Co., Ltd., Fukuoka, Japan

[21] Appl. No.: 187,918

[22] Filed: Jan. 28, 1994

Related U.S. Application Data

[63] Continuation-in-part of Ser. No. 20,742, Feb. 22, 1993, abandoned.

[51] Int. Cl.⁶ ..................................................... H04N 7/18
[52] U.S. Cl. .......................................... 348/154; 348/155
[58] Field of Search ....................................... 348/152, 153, 348/154, 155; 340/525

[56] References Cited

U.S. PATENT DOCUMENTS

| | | | |
|---|---|---|---|
| 4,112,463 | 9/1978 | Kamin | 348/154 |
| 4,198,653 | 4/1980 | Kamin | 348/155 |
| 5,003,616 | 3/1991 | Orita et al. | 348/130 |
| 5,134,472 | 7/1992 | Abe | 348/155 |
| 5,291,563 | 3/1994 | Maeda | 348/152 |
| 5,371,539 | 12/1994 | Okino et al. | 348/155 |

*Primary Examiner*—Tommy P. Chin
*Assistant Examiner*—A. Au
*Attorney, Agent, or Firm*—Wenderoth, Lind & Ponack

[57] ABSTRACT

A television-camera is used to obtain a video image of an area to be monitored, the video image being displayed on the display screen of a television receiver. A light pin is used to set plural display points on the display screen so as to define a specific area within the video image. By comparing density levels of successive frames of the video image, a moving object is detected. An alarm is generated if a detected moving object contacts a set number of the display points set using the light pin. Also, by employing two or more television-cameras oriented at different angles with respect to the area to be monitored, and by setting respective sets of display points for each the thus obtained video images, reliability of the alarm detection can be enhanced.

16 Claims, 7 Drawing Sheets

AUTOMATIC TELEVISION-CAMERA SUPERVISORY SYSTEM

CROSS-REFERENCE TO RELATED APPLICATIONS

This is a Continuation-In-Part of application Ser. No. 08/020,742, filed Feb. 22, 1993 now abandoned.

BACKGROUND OF THE INVENTION

1. Field of the Invention

The present invention generally relates to an automatic television-camera supervisory system. More particularly, the invention is directed to an automatic television-camera supervisory system which is adapted for monitoring an area of interest by taking a video image thereof using a television camera and reproducing the video image on an image screen of a television receiver monitor, and which is capable of detecting abnormalities occurring in the area being monitored.

2. Description of the Related Art

Heretofore, a so-called television supervisory system is composed of a television camera and a television receiver monitor, wherein a watchperson monitors an area of concern for the occurrence of an abnormality, such as an unauthorized approach or entry in the area, by watching a video image generated on the screen of the television receiver. Such a television-camera supervisory system is disadvantageous with respect to man-power and labor because the system requires the continuous attendance of a watchperson who is in charge of watching the television monitor. Recently, a supervisory system has been developed and adopted for practical applications which does not require the continuous attendance of a watchperson, but which instead calls for confirmation by the watchperson only when a possible abnormality has been detected. More specifically, the occurrence of an abnormal event in an area of interest is detected by a sensor, whereon a video image of the area associated with the sensor is picked up by a television camera to be reproduced on a screen of a television receiver for confirmation by the watchperson.

As noted above, the first mentioned supervisory system is disadvantageous with respect to labor requirements since a watchperson must always be attendant at a location where the television receiver monitor is installed for watching the scene generated on the screen thereof. In this respect, the second mentioned supervisory system is preferred over the former, because attendance and confirmation by the watchperson are called for only when an abnormality is detected by a sensor and a corresponding scene is generated on the television screen. However, the sensor used in the second mentioned supervisory system is typically constituted by an infrared ray sensor system which suffers drawbacks. First, because a light beam travelling in a straight line is made use of in the infrared sensor system, a predetermined face-to-face orientation must always be maintained between an infrared beam transmitter and a beam receiver. For this reason, a limitation is unavoidably imposed on the sensor area or the area to be monitored which is dependent on the availability of a place for installation of the light beam transmitter and the beam receiver. Thus, a difficulty is often encountered in the abnormality monitoring of a desired area. Second, the coverage of the infrared light beam is generally on the order of two or three hundred meters. In other words, the infrared sensor system is also limited with respect to coverage. Further, more than a minor expense is involved in installing the sensors and wiring the required electrical connections.

SUMMARY OF THE INVENTION

In the light of the state of the art described above, it is an object of the present invention to provide an automatic television-camera supervisory system in which a dangerous area can be set or defined in a scene generated on a television receiver monitor arbitrarily regardless of distance, geometry and location, to thereby make it possible to detect an object entering the thus defined area.

Another object of the present invention is to provide an automatic television-camera supervisory system which is capable of screening out objects of no concern such as small animals exemplified by birds, dogs, cats or the like, to thereby allow only a human being or a cargo handling gear influential to the dangerous area to be detected.

It is yet another object of the present invention to provide an automatic television-camera supervisory system which is immune to erroneous operation even in the case where a cloud or smoke makes an appearance in the background of the defined dangerous area and has a size equivalent to that of the object of concern.

It is a further object of the present invention to provide a laborsaving automatic television-camera supervisory system which is easy to handle and transport.

In view of the above and other objects which will become apparent as the description proceeds, there is provided according to an aspect of the invention an automatic television-camera supervisory system which includes a television camera for taking a video image of an area to be monitored, a television receiver monitor for generating the video image being taken by the television camera, a position detecting circuit capable of setting a plurality of sensor points indicating a dangerous portion at given locations on an image screen of the television receiver monitor by means of a light pen, and a sensor circuit capable of sensing a moving image corresponding to a moving object which contacts the sensor point or points to thereby detect the object which is moving into the dangerous portion on the image screen of the television receiver monitor.

The automatic television-camera supervisory system may further include a designating circuit capable of designating a number of sensor points which the moving image are to contact in dependence on a size of the image on the screen of the monitor television receiver, for thereby identifying discriminatively the moving object to be detected. Furthermore, for identifying more specifically the moving object, the automatic television-camera supervisory system may additionally include a density adjusting circuit capable of adjusting a detection reference level for detecting a change in density of the video image brought about in the dangerous portion upon entry of the moving image into the dangerous portion on the image screen of the television receiver monitor. Furthermore, for facilitating the handling and the transportation of the automatic television-camera supervisory system, the television receiver monitor, the position detector, the sensor circuit and the designating circuit may be accommodated within a single cabinet to thereby realize one integrated unit.

For operation of the automatic television-camera supervisory system, a television camera is installed in the area to be monitored for generating a video image of that area on a screen of the television receiver monitor. In this connection, it should be noted that the number of television cameras installed in the field is not limited to one, and a plurality of cameras may be employed with view angles thereof being so set as to differ from one another, wherein pictures picked up by these cameras can exchangeably be generated on the screen of the television receiver monitor by using an automatic camera change-over circuit. By contacting a light pen to a display image of the area or field generated on the television screen along a boundary of a dangerous area of concern, the boundary is defined in the picture on the screen in the form of a succession of plural sensor points. In the case where a moving image corresponding to a moving object makes an appearance on the television screen and contacts the sensor points, the sensor circuit is activated to thereby trigger an alarm circuit, whereby an alarm is generated. Since the sensor point number designating circuit and the density adjusting circuit for adjusting the detection level (or change in the density) are provided, the sensor circuit according to the invention is protected against erroneous operation even when a small animal such as a bird, dog, cat or the like contacts a number of the sensor points or even when a cloud, smoke or the like of a size corresponding to that of the object of concern makes an appearance in the dangerous area scene. The television receiver monitor, the position detecting circuit, the sensor circuit and the sensor point number designating circuit can be housed within a single cabinet. Accordingly, handling and transportation of the automatic television-camera supervisory system according to the present invention can easily be carried out even by a single person.

DESCRIPTION OF THE PREFERRED EMBODIMENTS

The automatic television-camera supervisory system according to the present invention will now be described in detail in conjunction with a preferred or exemplary embodiment thereof by reference to the accompanying drawings.

Figure 3:
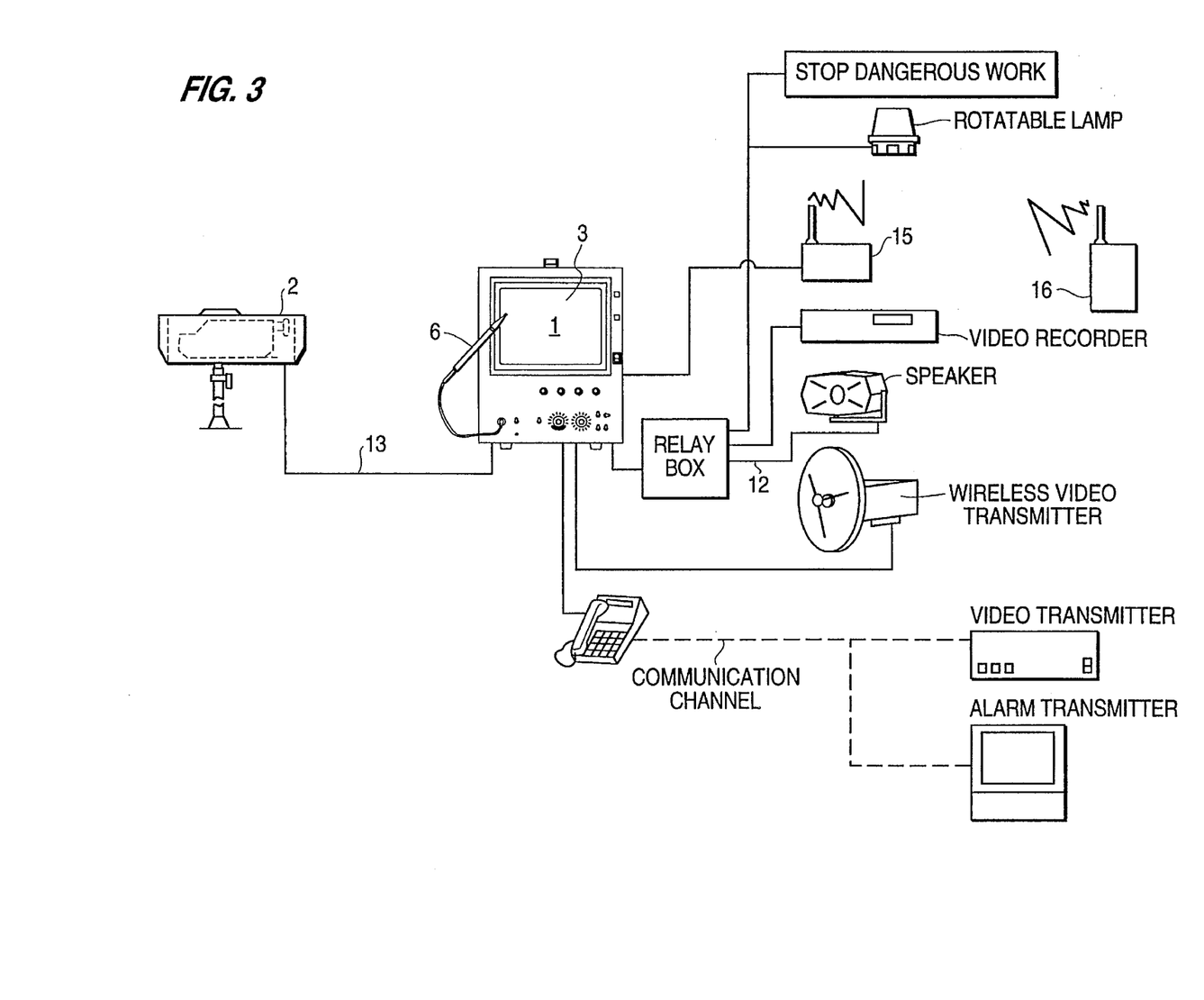
FIG. 3 is a block diagram showing a general system configuration of the automatic television-camera supervisory system according to an embodiment of the invention.
Figure 4:
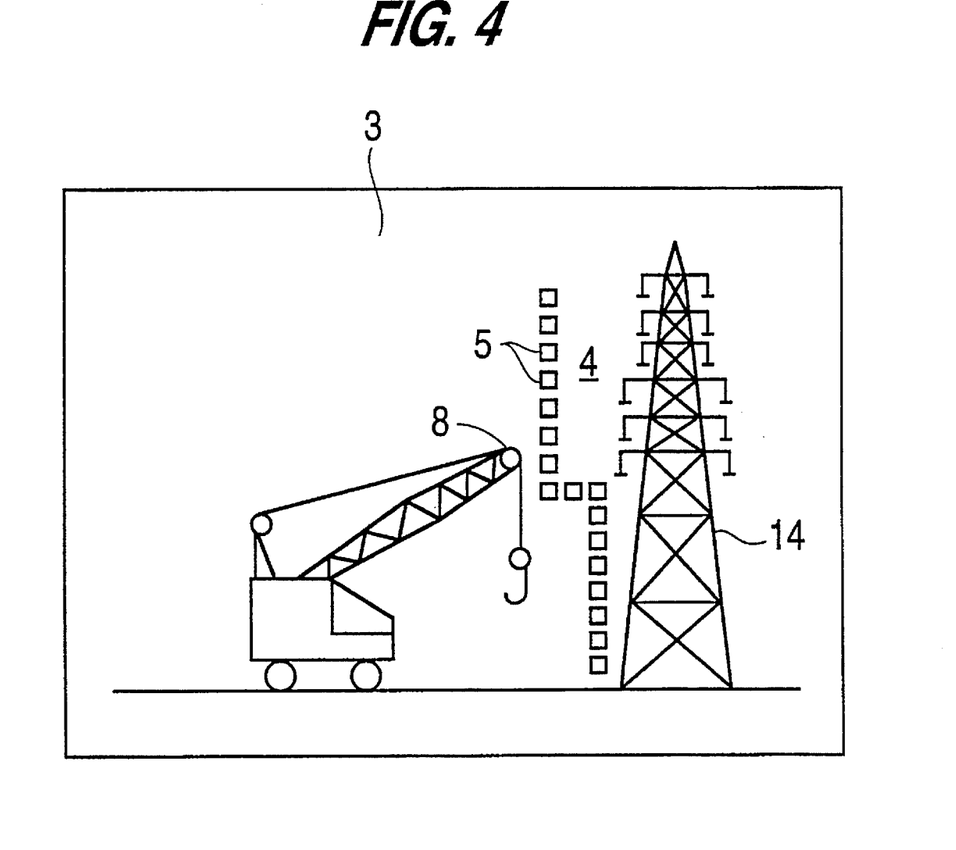
FIG. 4 is a plan view showing a video image generated on a screen of a monitor television receiver.

Referring first to FIG. 3 and FIG. 4, a monitor television 1 and a plurality of television cameras 2 (only one of which is shown in FIG. 3) are interconnected to constitute an automatic television-camera supervisory system. With this system, it is possible to take a video image of a dangerous area 4 (i.e., a place or area to be kept off) such as a high-voltage transmission line pylon 14, a fence, a railway platform or the like using the television camera 2 to thereby generate a corresponding picture on an image or view screen 3 of the monitor television receiver in such a manner as illustrated in FIG. 4. The video image of the dangerous area 4 which is to be kept off can be taken from a front side thereof in a two-dimensional format with the single television camera 2. It is assumed that the position of the camera 2 and that of the object (the dangerous area) are fixed at a predetermined distance. Therefore, when a video image of the transmission line pylon 14, or the like, in FIG. 4 is taken by the camera 2, the size thereof is fixed on the monitor television screen 3, and thus, the size of an object (moving object) 8 that is in the same position as the transmission line pylon 14 is also fixed on the screen 3. Hence, the dangerous area or the like corresponding to the size of the transmission line pylon 14 and that of the object 8 is set by the sensor points 5 (for example, n=17), and if the N object 8 approaches the transmission line pylon 14, it can be detected by the sensor points 5. Also, a number M of sensor points (for example, M=5) among the N sensor points 5 is designated by the sensor point designating circuit 10 according to the size of the object 8, thereby enabling only the detection of the object of a special size (the size of 5 sensor points) in the same position as the transmission line pylon 14.

Figure 5:
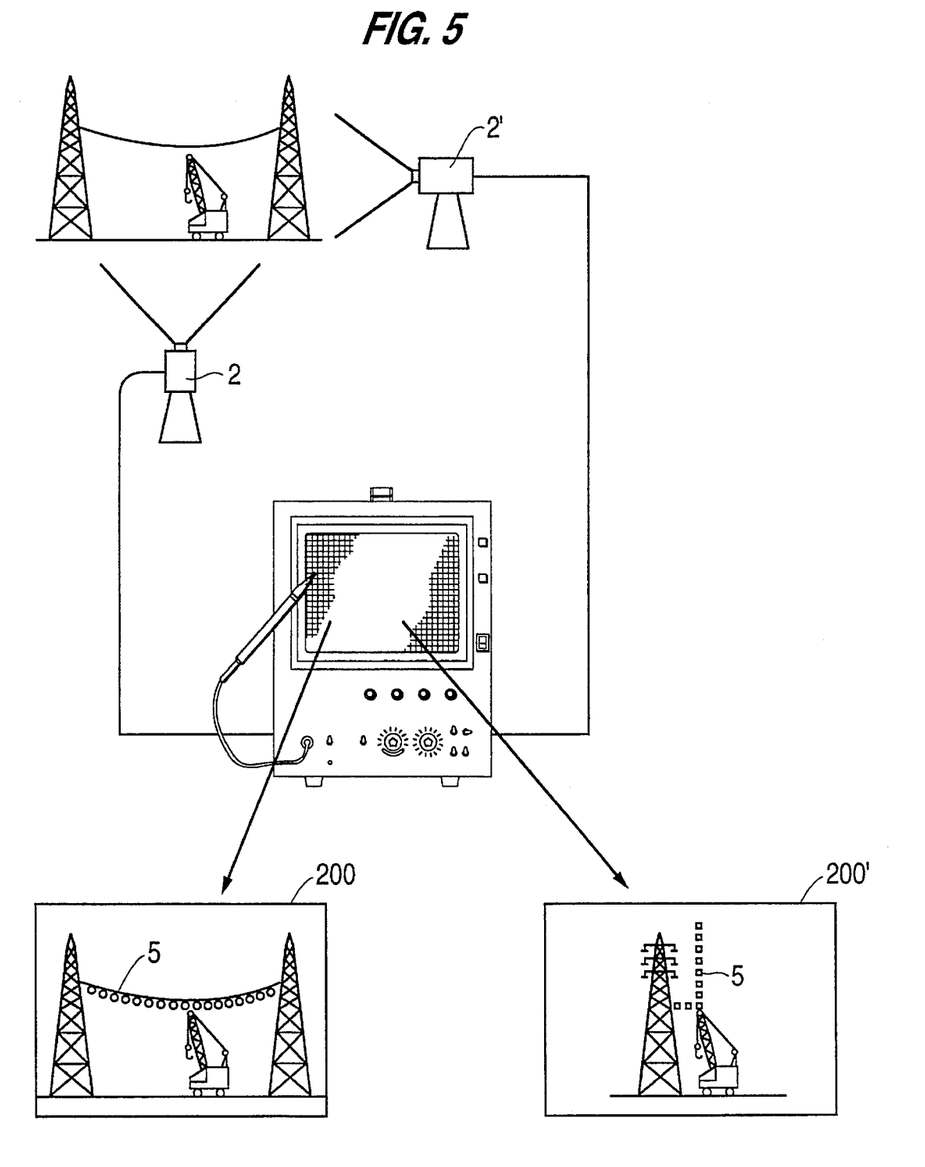
FIG. 5 illustrates the automatic television-camera supervisory system of the invention where two cameras are employed to obtain two video images of a monitored area.

Referring to FIG. 5, a pair of television cameras may be used to alternately obtain a front view and a side view of the dangerous area 4 to thereby improve the detection accuracy. A first television camera 2 is so disposed as to take a picture of a supervised area from the front side thereof and a second television camera 2' is so disposed as to take a picture of the same area from the side at a right angle relative to the view direction of the first camera. Video images 200 and 200' are respectively and alternately obtained by the first and second television cameras 2 and 2'. The display of the video images 200 and 200' from the respective television cameras is switched by an automatic television camera switching circuit built within the system so as to be alternately displayed on the monitor. The N sensor points 5 can be set vertically and horizontally relative to the front of the monitored area as shown in the image 200 (for example, N=17), and N' sensor points 5 can be set, and in a depth perspective (forward and backward dimension) relative to the front of the monitored area as shown in the image 200' (for example, N'=10).

As constructed above, the vertical and horizontal motion within the supervised area by the first television camera and the motion along the depth perspective within the same area by the second television camera can be monitored while being switched by the automatic switching circuit, thereby enabling three-dimensional, that is, the vertical and horizontal, and depth perspective monitoring within the supervised area.

Figure 6:
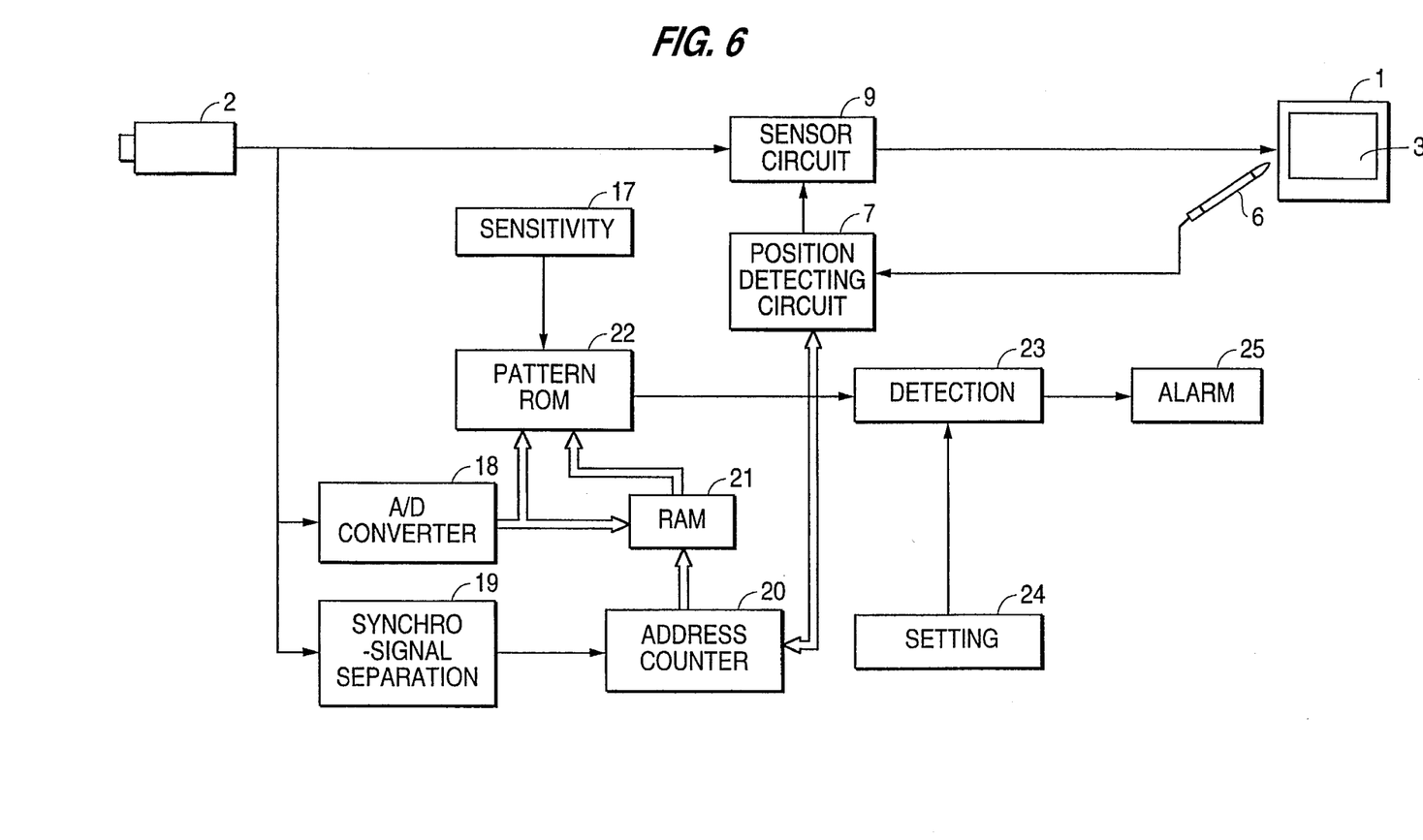
FIG. 6 is a block diagram showing a system configuration of the automatic television-camera supervisory system in which a fault detecting circuit is incorporated.

FIG. 6 is a block diagram showing a system configuration of the supervisory system of the invention.

In FIG. 6, a synchro-signal separation circuit 19 extracts a synchro-signal from a video signal transmitted from the video camera 2.

An address counter 20 sets 64 horizontal sensor points and 52 vertical sensor points (a total of 3328 points) of one screen according to the above synchro signal. It simultaneously allocates the sensor points as addresses of the RAM 21 and controls storing of all the sensor points in the RAM 21.

A 6-bit A/D converter 18 converts luminance signals of video signals from the video camera 2 into digital signals classified into 64-stepped density variations. The A/D converter 18 sequentially transmits the converted digital signals to the pattern ROM 22 and the RAM 21.

The RAM 21 stores the digital signals. More specifically, it stores a first input digital signal used for one field as old sampling data and also stores the following digital signal used for one field as new sampling data. When the digital signals placed in the same position of the sensor points designated by the light pen 6 are input from the A/D converter 18, the RAM 21 transmits the same signals to the pattern ROM 22 as the old data.

An address detecting circuit 7 transmits the marker position (sensor points) set on the television screen by the light pen 6 to the marker RAM 21 via the address counter 20. The RAM 21 stores the marker position set by the light pen 6. Upon the input of a digital signal having an address corresponding to the marker position stored in the RAM 21 as stated above, the RAM 21 transmits the signal to the pattern ROM 22 as the old data.

Figure 7A:
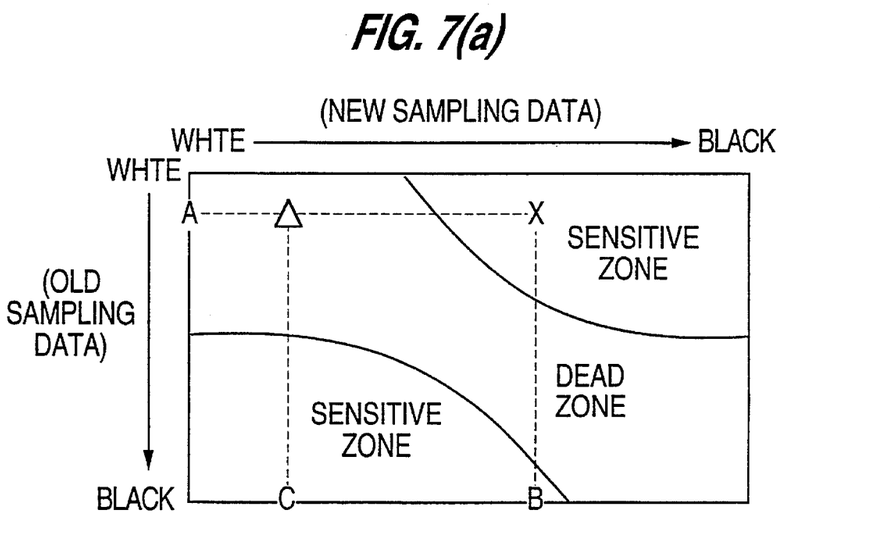
FIGS. 7(a)–7(b) are views for explaining the operation in connection with the pattern ROM shown in FIG. 6.

A look-up code (look-up table) is set in the pattern ROM 22 in advance. The new sampling data and the old sampling data are input from the A/D converter 18 and the RAM 21, respectively, to the pattern ROM 22. In the ROM 22, the sensitive zone in which a density variation is deemed to occur according to the luminance levels of the new and old sampling data, and the dead zone in which no density variation is deemed to occur are set in the look-up table (look-up code) as shown in FIG. 7(*a*). Referring to this code, it can be detected whether a density variation has occurred on the respective sensor points of the old and new sampling data. Upon comparing the old and new sampling data, when a density variation has occurred at the sensor point of either the old or new sampling data, an alarm signal (8-bit output data) including the position signal of the sensor points is adapted to be transmitted.

As described above, the image level on the sensor points is theoretically capable of distinguishing the 64-stepped density variations by the A/D converter 18. However, a subtle change of the image level constantly occurs, and if such a change is recognized as a direct signal, it causes an erroneous operation. In order to avoid such an error, the look-up code is set in the ROM 22 in advance and a reliable alarm signal is extracted therefrom.

The ROM 22 compares the new sampling data input from the A/D converter 18 with the old sampling data input from the RAM 21, and on the basis of the present look-up code (FIG. 7(*a*)), detects whether a density variation has occurred.

In FIG. 7(*a*), if the luminance level of the old sampling data is A and that of the new sampling data is C, both luminance levels change very little in the vicinity of the white level, thus referring to the point a in the dead zone and determining that no density variation has occurred. Hence, no alarm signal is transmitted. If the luminance level of the old sampling data is A and that of the new sampling data is B (FIG. 7(*a*)), a change in the luminance level is recognized, thus referring to the point X and determining that density variation has occurred. Hence, an alarm signal is transmitted to the detection circuit 23.

Moreover, the sensor point designating circuit 24 is provided to designate a certain number of sensor points subjected to the density variation among the sensor points set by the light pen 6 so as to give an alarm signal from the alarm circuit 25.

More specifically, assume that 10 sensor points (i.e., N (or N') is equal to 10) are designated by the light pen 6 and the sensor point designating circuit 24 designates 5 sensor points or more (i.e., M (or M') is equal to 5). When the detecting circuit 23 detects that 5 alarm signals are input from the ROM 22, it transmits an alarm signal to the alarm circuit 25 so as to give an alarm.

Figure 7B:
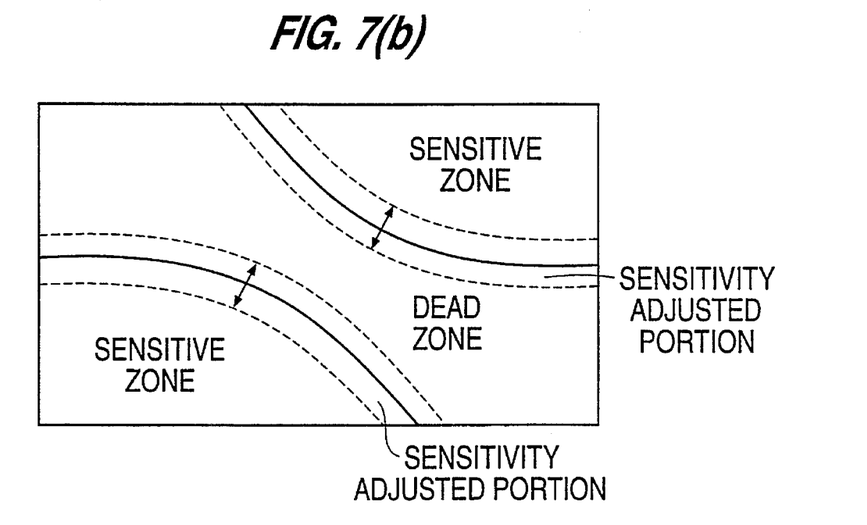

Further, a sensor sensitivity adjusting circuit 17 is arranged so as to adjust the detection sensitivity of the sensor, thereby adjusting the detection sensitivity as shown in FIG. 7(*b*). Thus, detection of, for example, low density items such as clouds and fog can be excluded from the detectable level.

The invention is characterized in that among the 52 vertical points and 64 horizontal points on the monitor screen (a total of 3328 points), only the operational sensor points are input for display by the light pen, thereby connecting these input sensor points so as to designate the area, that is, the dangerous area. The sensor points are created on the basis of the horizontal synchronization of the video signal. The horizontal line on one screen (one field) is divided into 64 dots and the vertical sensor points are divided into 52 lines. The respective sensor points are simultaneously allotted to the addresses of the RAM so as to be stored and updated.

The automatic television-camera supervisory system according to the instant embodiment of the invention is equipped with the position detecting circuit 7 (address detecting circuit) (FIG. 5) which permits a number of sensor points 5 (FIG. 4) indicative of the area 4 to be selectively picked-up or established with a light pen 6 (FIG. 3). Further, a sensor display circuit 9 may be provided for displaying a moving object 8 which contacts with the sensor points 5 on the television monitor screen 3. The light pen 6 provided in association with the position detecting circuit 7 may be constituted by a light pen which is usually available as an accessory part of a CRT (Cathode Ray Tube) display device used in a terminal of a computer system. The light pen 6 includes a photoelectric conversion element. Accordingly, when a small area on the monitor television screen 3 is pointed by contacting with a tip end of the light pen 6, an electron beam which is modulated with a picture signal for that small area and scans on the screen 3 is detected by the photoelectric element of the light pen 6, whereby the position of that small area on the monitor screen can be stored in a matrix array of the RAM 21.

As shown in FIG. 3, the alarm signal circuit 25 can generate an alarm by actuating an alarm buzzer or an alarm lamp (such as a speaker and a rotating lamp shown in FIG. 3) which are incorporated in the alarm circuit system. Further, an alarm can be transmitted by a wireless alarm transmitter 15 incorporated in the alarm signal circuit system 25. An alarm receiver 16 is shown in FIG. 3. This alarm receiver 16 can receive an alarm signal sent from the wireless alarm transmitter 15 which is installed at a location distanced remotely from the place where the supervisory system is installed. Parenthetically, an arbitrary number of alarm receivers 16 of a same type can be provided for thereby expanding the system.

In an arrangement of the monitor television 1 and a variety of major circuits of the automatic television-camera supervisory system, it is possible to provide the major circuits of the automatic television-camera supervisory system as well as a control unit therefor separately from the monitor television 1 as shown in FIG. 3. Alternatively, referring to FIGS. 1 and 2, they may be accommodated within a cabinet 11 in the form of a single unit. As described previously, a plurality of television cameras 2 can be connected. Since a simultaneous supervisory operation is performed in that case, it becomes necessary to generate on the monitor television receiver a picture 3 taken by the television camera 2 which sensed the alarm. This function can be realized by using an automatic camera change-over or switching circuit. The picture signal supplied from the monitor camera 2 is displayed as a picture on the monitor television receiver. However, since the television screen is flat, the picture generated on the monitor television lacks perspective or depth. Consequently, although motions in the vertical and horizontal directions can be detected, perspective motions in the direction perpendicular to the screen are impossible or difficult to detect. Accordingly, as noted previously, it is preferred to use at least two television cameras, wherein one picture is taken by a first camera while another picture is taken by the second camera in the direction oriented at an angle of e.g. 45° or 90° relative to the view or heading direction of the first camera. In that case, by orienting the second monitor camera 2 such that a front and a side of the area of concern can be taken in the oblique direction, not only the motions in the vertical and horizontal directions but also the motions in the perspective or depth direction can simultaneously be monitored. In this way, a so-called three-dimensional supervision can be realized. In this conjunction, the alarm signal circuit 25 may be implemented in such a circuit configuration which produces an alarm signal when a moving object is sensed by the two monitor cameras 2 at one and the same location.

In the automatic television-camera supervisory system according to of the invention, discrete sensor points 5 on the screen 3 of the monitor television receiver 1 are set and a logical AND function is adopted for the detection of an object of concern. More specifically, it is the system is capable of designating the number of sensor points 5 in dependence on the size of an object to be detected notwithstanding the possibility of detecting a moving object which contacts only one sensor point. For example, assuming that the object to be detected is a human being, then motion of the object correspond to a contact with ten sensor points. Accordingly, when only the human being is to be detected, this can be realized by designating ten sensor points. In that case, small animals such as dogs and birds are not detected by the automatic television-camera supervisory system. The sensor point designating circuit 24 is provided for designating the number of sensor points in dependence on the size of the object to be detected and may be implemented in the form of a sensor-point designating dial circuit 10' shown in FIG. 1, so that a desired number of the sensor points can selectively be established through a simple procedure.

Figure 1:
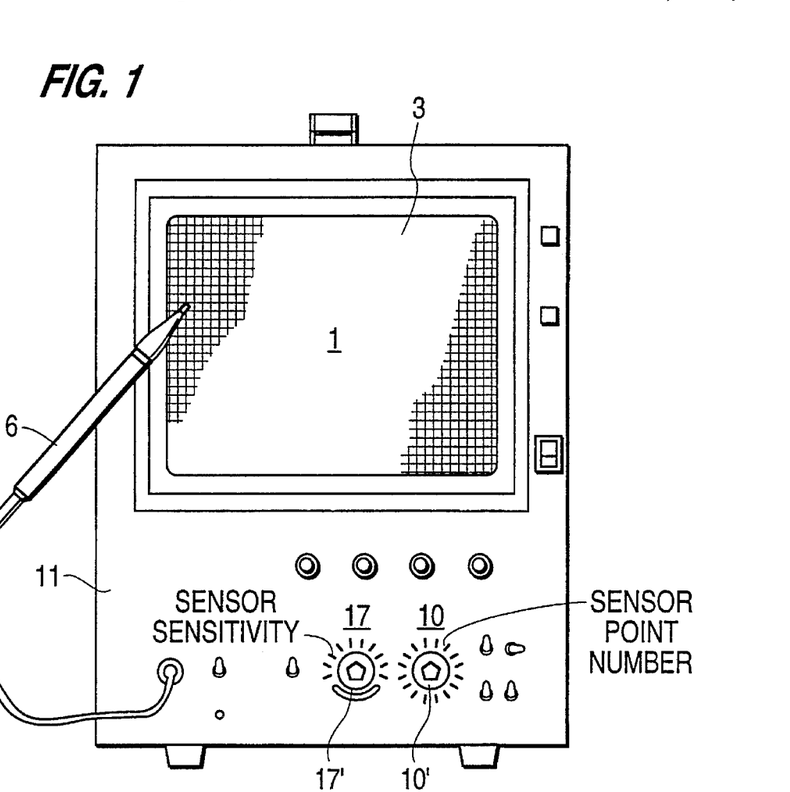
FIG. 1 is a front view showing a main part including a monitor television receiver of an automatic television-camera supervisory system according to an embodiment of the present invention.
Figure 2:
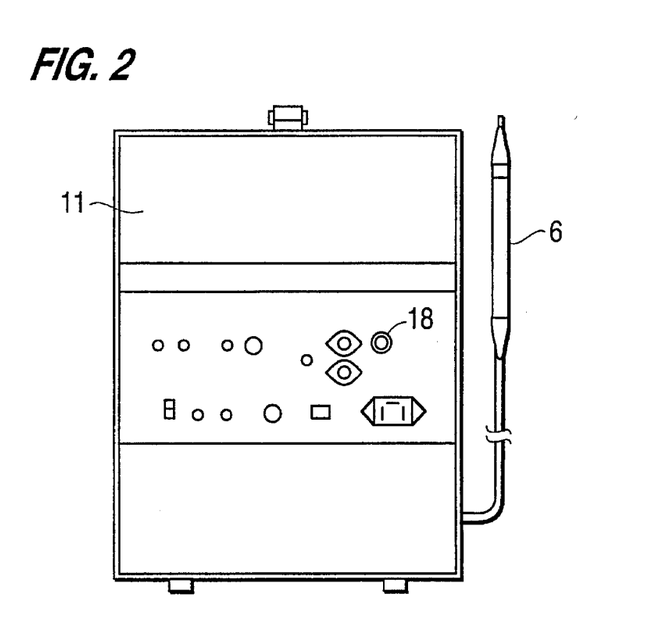
FIG. 2 is a rear side view of the same.

In the case of an application where the automatic television-camera supervisory system is installed in the field out doors, there may be encountered such situation in which cloud and/or smoke invade the area being monitored on the television screen, to thereby provide a cause for erroneous detection. For coping with this problem, an automatic television-camera supervisory system includes the density adjusting circuit 17 provided for preventing the false alarm generation due to detection of cloud and/or smoke. By adjusting appropriately the reference level for the detection of the difference in density by means of the above-mentioned density adjusting circuit 17, it is possible to set such a detection reference level with which cloud and smoke are not detected. The density adjusting circuit 17 should preferably be provided with a density adjusting dial 17' such as shown in FIG. 1 for adjusting the reference level for the detection of the difference in picture density.

Figure 8:
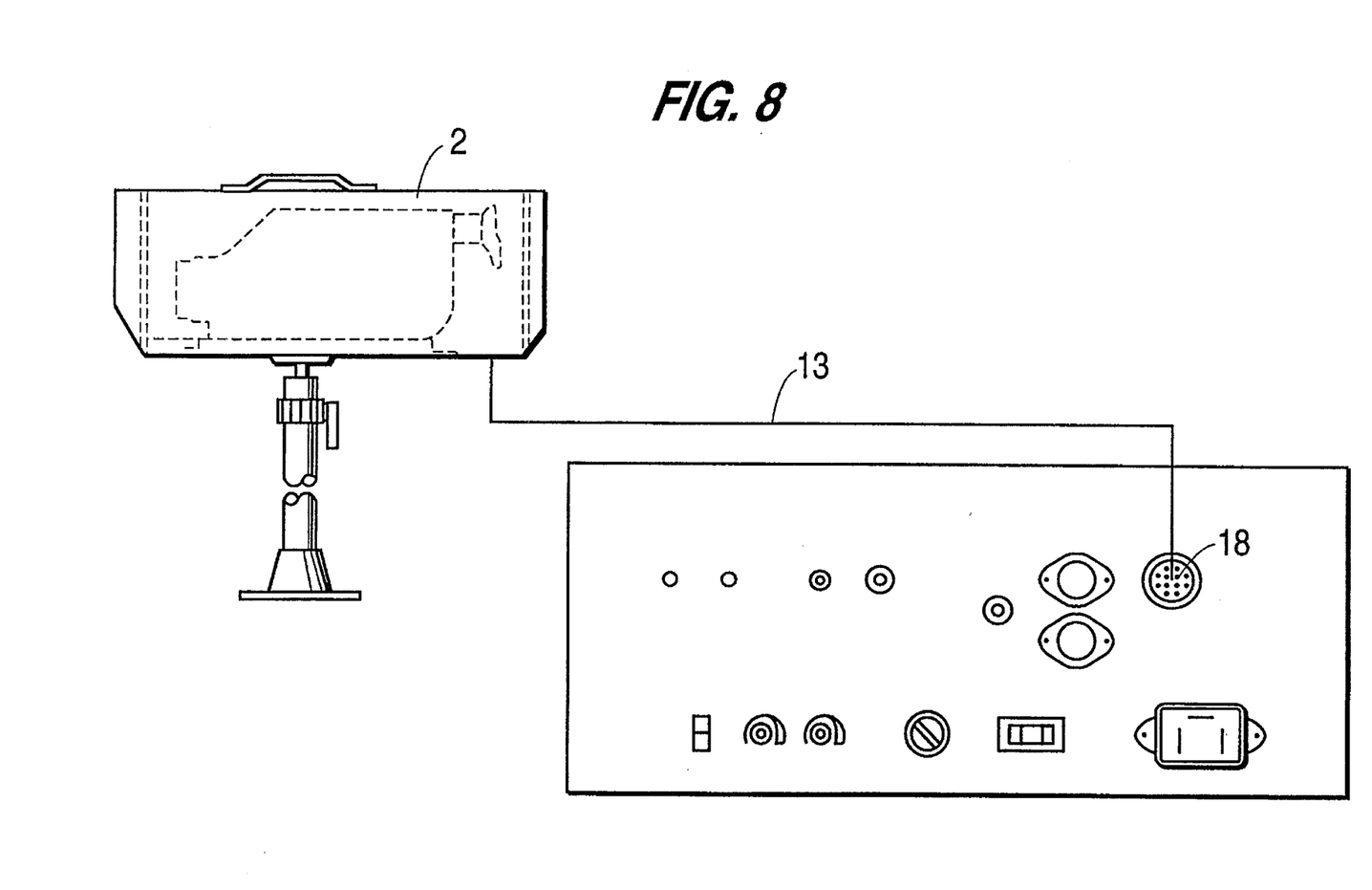
FIG. 8 is a rear side view of a control unit in the automatic television-camera supervisory system which is separated from the monitor television receiver and electrically connected thereto.

As mentioned previously, in the automatic television-camera supervisory system according to the invention, the position detecting circuit 7, the sensor circuit 9, the sensor point designating circuit 10 and the density adjusting circuit 17 should preferably be housed within a cabinet 11 which accommodates therein the monitor television set as well as accessaries thereof. Parenthetically, in the automatic television-camera supervisory system, there may occur breakage of a coaxial cable 13 extending from the television camera 2, loosening of a connector 18 (FIG. 8), abnormalities of the internal circuits and the like which are likely to be overlooked, providing causes for malfunction or incapability of operation inconveniently and unfavorably for the use of the system. In an attempt to solve this problem, a fault detecting circuit may be provided in the configuration of FIG. 5 for detecting a lowering of a picture luminance level to thereby detect a fault.

Finally, it should be mentioned that by using the wireless transmitter 15 in combination with the wireless receiver 16, it is possible to inform a moving object (e.g., a human being) of the fact that it is moving into a dangerous area or already trespassed that area when this fact is detected on the screen 3 of the monitor television. Further, by connecting a wireless image data transmission unit to the automatic television-camera supervisory system according to the invention, it is possible to watch a picture of an area to be monitored at a location distanced far from that area or receive detection information.

As will now be understood from the foregoing description, it is possible according to the teachings of the invention to depict or establish a sensor area over a place to be monitored while watching the monitor television 1, wherein upon contact of an object with the sensor area an alarm can be issued. Such sensor area can be created anywhere so long as it lies within a range which can be covered by the television camera 2. Thus, even dangerous areas such as those extending in the sky or over a sea can be set as the sensor area so long as it can be caught by the television camera 2.

The supervisory system known heretofore in which an infrared sensor is employed is based on a two-dimensional detection principle with the sensor being installed in the field of concern. In contrast, the automatic television-camera supervisory system according to the invention is capable of detecting an object moving or entering into a dangerous area from a picture taken by the television camera 2 and generated on the monitor television screen without need for installing the sensor in the area of concern. Further, by using a plurality of television cameras 2, three-dimensional detection, so to say, can be realized. Additionally, erroneous operation due to invasion of small animals such as dogs, cats, birds and the like can positively be prevented.

Furthermore, since the major components of the automatic television-camera supervisory system according to the invention can all be accommodated within a single cabinet or box 11, the system can easily be handled and transported. Thus, labor involved in the installation of the television monitor and other components can significantly be reduced.

What is claimed is:

1. An automatic television-camera supervisory system, comprising:

a television camera for obtaining a video image of a general area to be monitored;

a television monitor, including a display screen, for displaying the video image obtained by said television camera on said display screen;

setting means for setting N discrete display points on said display screen, where N is an integer greater than 1, said N discrete display points defining a specific area to be monitored within said video image of said general area to be monitored;

detecting means for automatically detecting that a moving object is contained within said video image displayed on said display screen in response to a change in a display state of at least M of said N discrete display points set by said setting means, where 1<M<N; and, alarm means for activating an alarm when said detecting means detects that a moving object is contained within said video image.

2. An automatic television-camera supervisory system as claimed in claim 1, further comprising adjusting means for adjusting a value of M.

3. An automatic television-camera supervisory system as claimed in claim 1, wherein said video image is constituted by a plurality of successive image frames each defining an image density of each display point contained therein, wherein said detecting means includes means for determining, for each of said N discrete display points set by said setting means, whether a change in image density from one image frame to a subsequent image frame exceeds a predetermined threshold, and wherein said automatic television-camera supervisory system further comprises adjusting means for adjusting said predetermined threshold.

4. An automatic television-camera supervisory system as claimed in claim 2, wherein said video image is constituted by a plurality of successive image frames each defining an image density of each display point contained therein, wherein said detecting means includes means for determining, for each of said N discrete display points set by said setting means, whether a change in image density from one image frame to a subsequent image frame exceeds a predetermined threshold, and wherein said automatic television-camera supervisory system further comprises second adjusting means for adjusting said predetermined threshold.

5. An automatic television-camera supervisory system as claimed in claim 4, further comprising a single cabinet having housed therein said television monitor, said setting means, said detecting means, and said first and second adjusting means.

6. An automatic television-camera supervisory system as claimed in claim 1, wherein said setting means includes a light pen.

7. An automatic television-camera supervisory system as claimed in claim 4, wherein said setting means includes a light pen.

8. An automatic television-camera supervisory system, comprising:

first and second television cameras for obtaining respective first and second video images of general areas to be monitored, said first and second video images being obtained from different orientations of said general area to be monitored;

a television monitor, including at least one display screen, for displaying the respective first and second video images obtained by said first and second television cameras on said at least on display screen;

setting means for setting N discrete display points on said at least one display screen for said first video image and N' discrete display points on said at least one display screen for said second video image, where N and N' are integers greater than 1, said N and N' discrete display points respectively defining first and second specific areas to be monitored within said first and second video images of said general area to be monitored;

detecting means for automatically detecting that a moving object is contained within said first video image displayed on said at least on display screen in response to a change in a display state of at least M of said N discrete display points set by said setting means, where 1<M<N, and for automatically detecting that a moving object is contained within said second video image displayed on said at least one display screen upon a change in a display state of at least M' of said N', discrete display points set by said setting means, where 1<M'<N'; and alarm means for activating an alarm when said detecting means detects that both a moving object is contained within said first video image and a moving object is contained within said second video image.

9. An automatic television-camera supervisory system as claimed in claim 8, further comprising adjusting means for adjusting a value of M and M'.

10. An automatic television-camera supervisory system as claimed in claim 8, wherein each of said first and second video images is constituted by a plurality of successive image frames each defining an image density of each display point contained therein, wherein said detecting means includes means for determining, for each of said N and N' discrete display points set by said setting means, whether a change in image density from one image frame to a subsequent image frame exceeds at least one predetermined threshold, and wherein said automatic television-camera supervisory system further comprises adjusting means for adjusting said at least one predetermined threshold.

11. An automatic television-camera supervisory system as claimed in claim 9, wherein each of said first and second video images is constituted by a plurality of successive image frames each defining an image density of each display point contained therein, wherein said detecting means includes means for determining, for each of said N and N' discrete display points set by said setting means, whether a change in image density from one image frame to a subsequent image frame exceeds at least one predetermined threshold, and wherein said automatic television-camera supervisory system further comprises second adjusting means for adjusting said at least one predetermined threshold.

12. An automatic television-camera supervisory system as claimed in claim 8, wherein said television monitor includes a single display screen and means for alternately displaying said first and second video images on said single display screen.

13. An automatic television-camera supervisory system as claimed in claim 11, wherein said television monitor includes a single display screen and means for alternately displaying said first and second video images on said single display screen.

14. An automatic television-camera supervisory system as claimed in claim 13, further comprising a single cabinet having housed therein said television monitor, said setting means, said detecting means, said alarm means, and said first and second adjusting means.

15. An automatic television-camera supervisory system as claimed in claim 8, wherein said setting means includes a light pen.

16. An automatic television-camera supervisory system as claimed in claim 13, wherein said setting means includes a light pen.

* * * * *